United States Patent
Thackway et al.

(10) Patent No.: US 10,139,108 B2
(45) Date of Patent: Nov. 27, 2018

(54) D5/D5A DF-42 INTEGRATED EXIT CONE AND SPLASH PLATE

(71) Applicant: Siemens Energy, Inc., Orlando, FL (US)

(72) Inventors: Richard L. Thackway, Oviedo, FL (US); Charalambos Polyzopoulos, Jr., Orlando, FL (US); James M. Hurney, Port Orange, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 644 days.

(21) Appl. No.: 14/732,954

(22) Filed: Jun. 8, 2015

(65) Prior Publication Data

US 2016/0356496 A1 Dec. 8, 2016

(51) Int. Cl.
| | |
|---|---|
| F23R 3/00 | (2006.01) |
| F23R 3/06 | (2006.01) |
| F01D 9/02 | (2006.01) |
| F23R 3/60 | (2006.01) |
| F02C 3/14 | (2006.01) |
| F23R 3/54 | (2006.01) |

(52) U.S. Cl.
CPC .............. *F23R 3/002* (2013.01); *F01D 9/023* (2013.01); *F23R 3/06* (2013.01); *F02C 3/145* (2013.01); *F05B 2260/20* (2013.01); *F05B 2260/203* (2013.01); *F05D 2260/20* (2013.01); *F23R 3/54* (2013.01); *F23R 3/60* (2013.01); *F23R 2900/03043* (2013.01); *Y02T 50/676* (2013.01)

(58) Field of Classification Search
CPC .... F23R 3/002; F23R 3/60; F23R 3/54; F23R 2900/03043; F01D 9/023; F05B 2260/20; F05B 2260/203; F02C 3/145
See application file for complete search history.

(56) References Cited

U.S. PATENT DOCUMENTS

| | | | |
|---|---|---|---|
| 2007/0256417 A1* | 11/2007 | Parker | F23M 5/00 60/748 |
| 2011/0247340 A1* | 10/2011 | Popovic | F23R 3/002 60/752 |
| 2012/0047910 A1* | 3/2012 | Sutcu | F01D 9/023 60/796 |

OTHER PUBLICATIONS

Thackway, Richard L., et al. Utility U.S. Appl. No. 14/525,279, filed Oct. 28, 2014, entitled "D5/D5A DF-42 Doubled Walled Exit Cone and Splash Plate".

* cited by examiner

*Primary Examiner* — Craig Kim
*Assistant Examiner* — Katheryn Malatek

(57) ABSTRACT

A combustor basket assembly for a gas turbine engine that includes a combustor basket having a basket liner including an input end and an output end. An integrated exit cone and splash plate member is affixed to the output end of the basket liner and includes a base portion, an exit cone portion and a splash plate portion. The base portion includes an annular cooling channel that receives a cooling air flow and the exit cone portion and the splash plate portion each include an array of cooling feed holes in fluid communication with the cooling channel. The spacing between the feed holes and the size of the feed holes can be optimized to provide more cooling for hotter regions.

17 Claims, 4 Drawing Sheets

D5/D5A DF-42 INTEGRATED EXIT CONE AND SPLASH PLATE

BACKGROUND OF THE INVENTION

Field of the Invention

This invention relates generally to an integrated exit cone and splash plate member affixed to an output end of a combustion basket in a gas turbine engine and, more particularly, to a combustion basket assembly for a gas turbine engine, where the assembly includes an integrated exit cone and splash plate member affixed to an output end of a combustion basket, and where the member includes an exit cone portion and a splash plate portion each having an array of cooling channels.

Discussion of the Related Art

The world's energy needs continue to rise which provides a demand for reliable, affordable, efficient and environmentally-compatible power generation. A gas turbine engine is one known machine that provides efficient power, and often has application for an electric generator in a power plant, or engines in an aircraft or a ship. A typical gas turbine engine includes a compressor section, a combustion section and a turbine section. The compressor section provides a compressed airflow to the combustion section where the air is mixed with a fuel, such as natural gas. The combustion section includes a plurality of circumferentially disposed combustors that receive the fuel to be mixed with the air and ignited to generate a working gas. The working gas expands through the turbine section and is directed across rows of blades therein by associated vanes. As the working gas passes through the turbine section, it causes the blades to rotate, which in turn causes a shaft to rotate, thereby providing mechanical work.

The temperature of the working gas is tightly controlled so that it does not exceed some predetermined temperature for a particular turbine engine design because too high of a temperature can damage various parts and components in the turbine section of the engine. However, it is desirable to cause the temperature of the working gas to be as high as possible because the higher the temperature of the working gas, the faster the flow of the gas because of the higher energy of the working gas through the turbine engine, which results in a more efficient operation of the engine.

In certain gas engine turbine designs, a portion of the compressed airflow is also used to provide cooling for certain components in the combustion section and the turbine section, such as the vanes, blades and ring segments. The more efficient cooling, where more efficient cooling maintains temperature with less cooling air, that can be provided to these and other components allows the components to be maintained at a lower temperature, and thus the higher the temperature the working gas can be, where more leakage decreases engine power. For example, by reducing the temperature of the compressed air, less compressed air is required to maintain the part at the desired temperature, resulting in a higher working gas temperature, lower air leakage, more mass flow through the engine for power extraction and a greater power and efficiency from the engine. Further, by using less cooling air at one location in the turbine section, more cooling air can be used at another location in the turbine section. In one known gas turbine engine design, 80% of the compressed airflow is mixed with the fuel to provide the working gas and 20% of the compressed airflow is used to cool engine parts.

In one known gas turbine engine design, a combustor basket is provided in each combustor of the engine, where the fuel and air are mixed and ignited to generate a hot working gas. The hot working gas from the combustor basket flows into a transition component and is directed to the first row of vanes in the engine. It has been shown that some of the hot working gas that exits the combustor basket enters a recirculation zone as a result of a combustor basket exit cone, where the gases flow upstream in a direction towards the exit of the combustor basket, which sometimes causes burning of a downstream surface of the exit cone and a basket liner. It is known in the art to add a splash plate to the basket liner at the end of the combustion basket that prevents the hot working gas from directly impinging and burning the basket liner. The splash plate provides backside cooling for both the inner diameter surface and outer diameter surface of the basket, which allows both surfaces to be coated with a thermal barrier coating. Cooling flow is provided to the backside surface of the exit cone through cooling holes in the basket liner. However, the single wall exit cone still experiences heating distress. Particularly, the cooling air supply provided to the cooling holes in the basket liner is split between the splash plate and the exit cone, where the splash plate typically receives the majority of the cooling air. It is difficult to control the separation of the cooling air to the exit cone and the splash plate, where the exit cone could receive reduced cooling and increased distress.

SUMMARY OF THE INVENTION

The present disclosure describes a combustor basket assembly for a gas turbine engine that includes a combustor basket having a basket liner including an input end and an output end. An integrated exit cone and splash plate member is affixed to the output end of the basket liner and includes a base portion, an exit cone portion and a splash plate portion. The base portion includes an annular cooling channel that receives a pressurized cooling air flow and the exit cone portion and the splash plate portion each include an array of cooling feed holes in fluid communication with the cooling channel. The spacing between the feed holes and the size of the feed holes can be optimized to provide more cooling for hotter regions.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an integrated exit cone and splash plate member affixed to an output end of a combustor basket liner in a gas turbine engine is merely exemplary in nature, and is in no way intended to limit the invention or its applications or uses.

Figure 1:
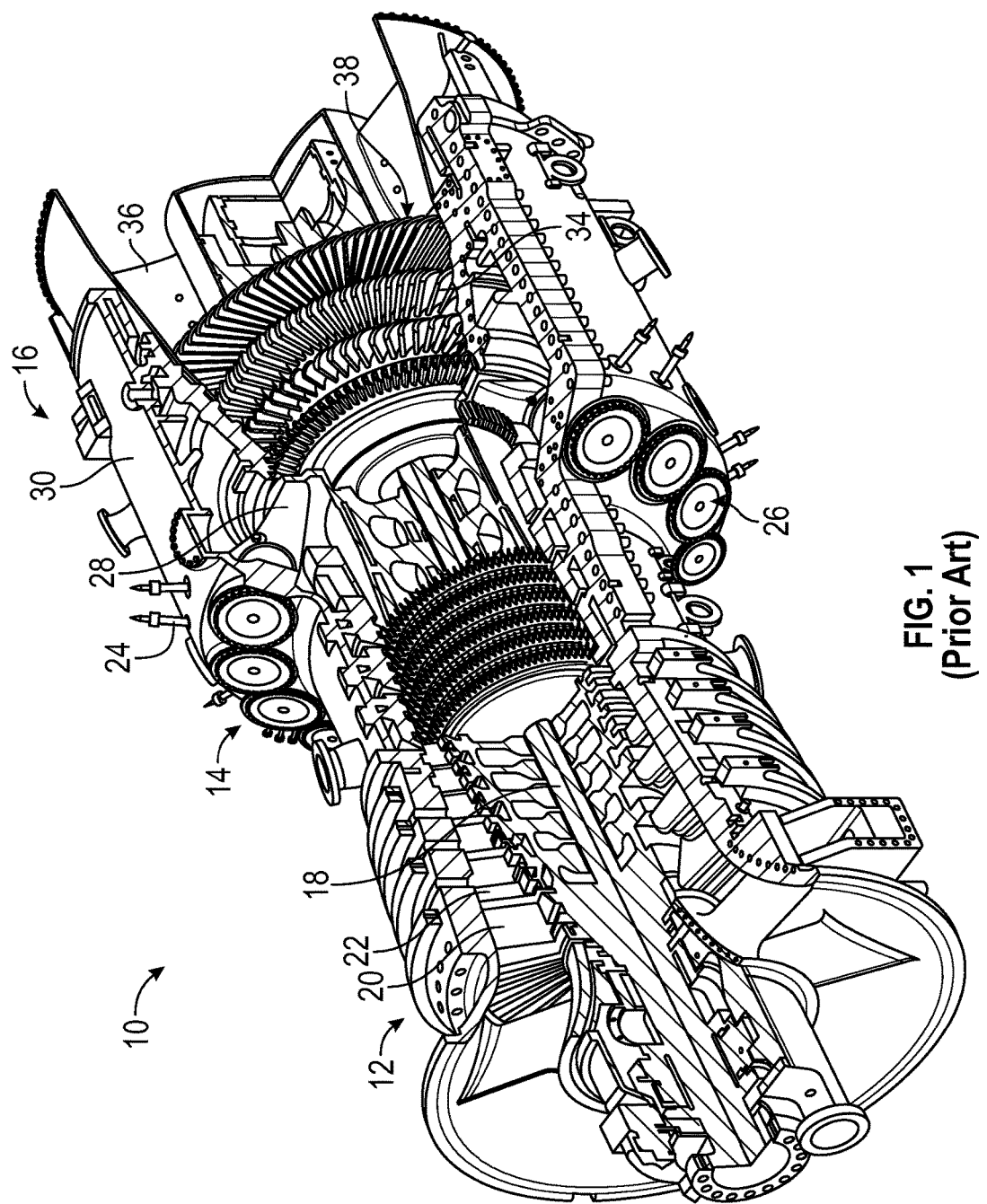
FIG. 1 is a cut-away, isometric view of a gas turbine engine.

FIG. 1 is a cut-away, isometric view of a gas turbine engine 10 including a compressor section 12, a combustion section 14 and a turbine section 16 all enclosed within an outer housing or casing 30, where operation of the engine 10 causes a central shaft or rotor 18 to rotate, thus creating mechanical work. The engine 10 is illustrated and described by way of a non-limiting example to provide context to the invention discussed below. Those skilled in the art will appreciate that other gas turbine engine designs can also be used in connection with the invention. Rotation of the rotor 18 draws air into the compressor section 12 where it is directed by vanes 22 and compressed by rotating blades 20 to be delivered to the combustion section 14, where the compressed air is mixed with a fuel, such as natural gas, and where the fuel/air mixture is ignited to create a hot working gas. More specifically, the combustion section 14 includes a number of circumferentially disposed combustors 26 each receiving the fuel that is injected into the combustor 26 by an injector (not shown), mixed with the compressed air and ignited by an igniter 24 to be combusted to create the working gas, which is directed by a transition component 28 into the turbine section 16. The working gas is then directed by circumferentially disposed stationary vanes (not shown in FIG. 1) in the turbine section 16 to flow across circumferentially disposed turbine blades 34, which causes the turbine blades 34 to rotate, thus rotating the rotor 18. Once the working gas passes through the turbine section 16 it is output from the engine 10 as an exhaust gas through an output nozzle 36.

Each group of the circumferentially disposed stationary vanes defines a row of the vanes and each group of the circumferentially disposed blades 34 defines a row 38 of the blades 34. In this non-limiting embodiment, the turbine section 16 includes four rows 38 of the rotating blades 34 and four rows of the stationary vanes in an alternating sequence. In other gas turbine engine designs, the turbine section 16 may include more or less rows of the turbine blades 34. It is noted that the most forward row of the turbine blades 34, referred to as the row 1 blades, and the vanes, referred to as the row 1 vanes, receive the highest temperature of the working gas, where the temperature of the working gas decreases as it flows through the turbine section 16.

Figure 2:
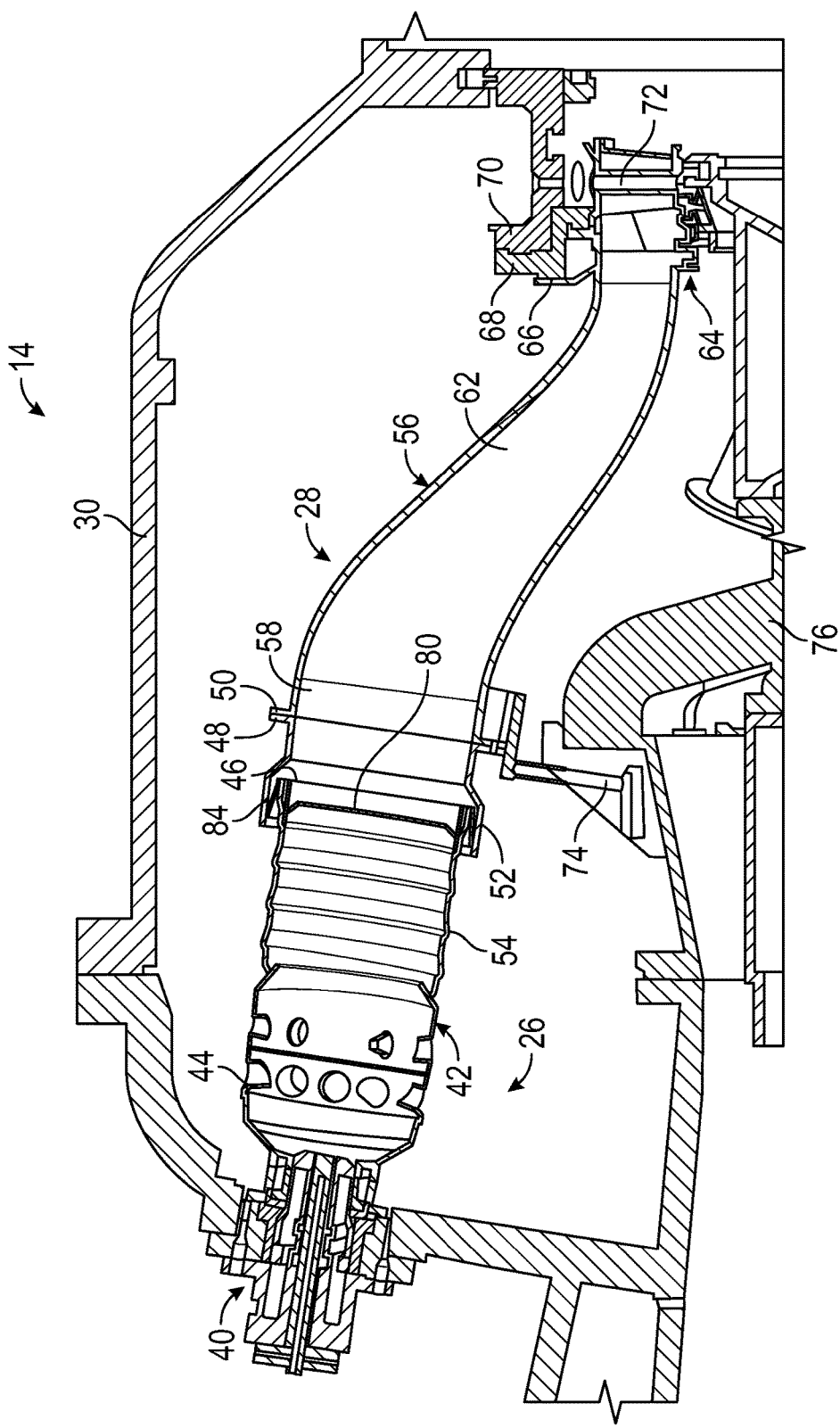
FIG. 2 is a cut-away, cross-sectional type view of a portion of a known combustion section for a gas turbine engine.

FIG. 2 is a cut-away, cross-sectional type view of a portion of the combustion section of a gas turbine engine having a similar design to the gas turbine engine 10 and showing one of the combustors 26 and one of the transition components 28. The combustor 26 includes a nozzle section 40 through which the fuel is injected into a cylindrical combustor basket 42 in a controlled manner as is well understood by those skilled in the art. Air from the compressor section 12 enters the combustor basket 42 through circumferentially disposed openings 44, where the air/fuel mixture is ignited by the igniter 24 (see FIG. 1) to generate the hot working gas. The working gas flows through a cylindrical basket liner 54 that defines an enclosure of the basket 42 towards a basket exit 46 at an end of the basket 42 opposite to the nozzle 40.

Figure 3:
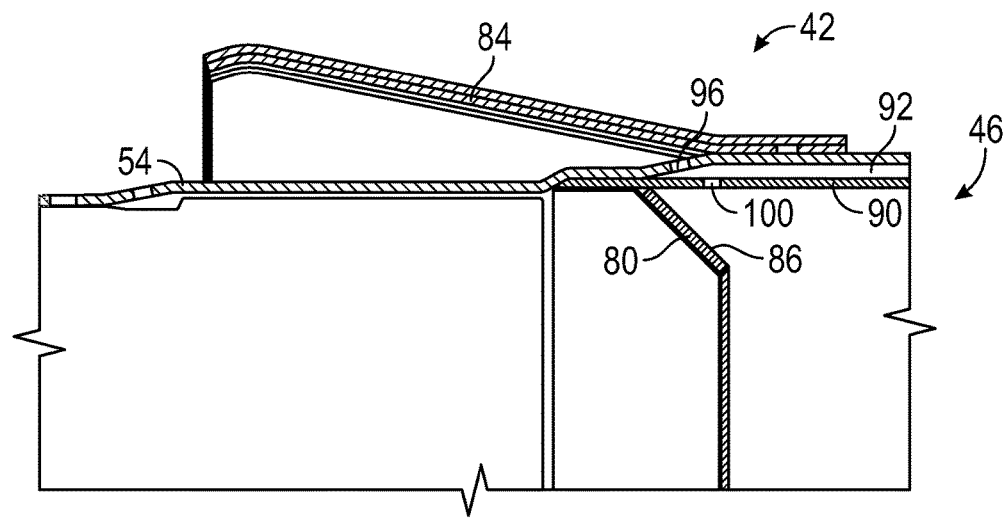
FIG. 3 is a cut-away, cross-sectional type view of an area at the end of the basket liner of the combustion section shown in FIG. 2.

FIG. 3 is broken-away, cross-sectional type view of a portion of the output end of the basket 42. An annular exit cone 80 is mounted within the basket liner 54 upstream from the basket exit 46 through which the hot working gas exits the basket 42. The end of the basket liner 54 is slid into a transition cylinder 52 having an annular mounting flange 48. A spring clip 84 is secured to an outside surface of the basket liner 54 at the basket exit 46 and provides a spring force against the transition cylinder 52 to hold the basket 42 within the transition cylinder 52.

The transition component 28 includes an annular flange 50 at an input end that is mounted to the annular flange 48 of the transition cylinder 52. The transition component 28 also includes a curved transition section 56 extending from the flange 50 that includes an inlet ring portion 58 and defining an internal chamber 62. An end of the transition section 56 opposite to the flange 50 includes a seal 64 and a mounting flange 66 through which the working gas is output to the turbine section 16. The transition section 56 transitions from a circular opening at the input end of the component 28 to a rectangular opening at the output end of the component 28. The mounting flange 66 is mounted to a ring bracket 68 that is secured to a blade ring 70, all well known to those skilled in the art. The seal 64 of the transition section 56 is positioned adjacent to row 1 vanes 72 that receive and direct the hot gas to the row 1 blades. A mounting bracket 74 is mounted to the transition section 56, as shown, and to a compressor exit diffuser 76.

Analysis has shown that the exit cone 80 creates a recirculation zone within the area between the exit cone 80 and the basket exit 46 that causes hot gas to be recirculated back towards the combustor basket 42 and impinge a backside surface 86 of the exit cone 80. For the current combustor basket design, it is not possible to apply a thermal barrier coating (TBC) to the outer surface of the basket liner 54 including the backside surface 86 of the exit cone 80 because that coating would insulate basket components from cooling air provided to cool the basket 42. In order to address this problem, it is known in the art to provide an annular splash plate 90 mounted to the basket liner 54 within the basket exit 46, but outside of the exit cone 80, as shown, that defines a cooling channel 92 therebetween. A series of spaced apart cooling feed holes 96 are provided through the basket liner 54 at the basket exit 46 that receive cooling air flowing between the spring clip 84 and the basket liner 54 and into the channel 92. Further, a series of spaced apart feed holes 100 are provided in the splash plate 90 that allow the cooling air flowing through the feed holes 96 to also flow through the splash plate 90 and cool the exit cone 80. However, this creates a problem because the cooling air is fed to the exit cone 80 by the same feed holes that provide cooling flow to the splash plate 90, and thus there is a reduction in the amount of cooling air that can be provided to the exit cone 80. This can be compensated for by increasing the size of the feed holes 96 and 100 for the cooling air, however, it is difficult to control the cooling air that is split between the exit cone 80 and the splash plate channel 92.

The present invention proposes solutions to this problem that allow all relevant surfaces of the basket liner 54, the basket exit 46 and the exit cone 80 to be provided with a thermal barrier coating, and also allows a controlled amount of cooling air supplied to the exit cone 80 and the splash plate 90.

Figure 4:
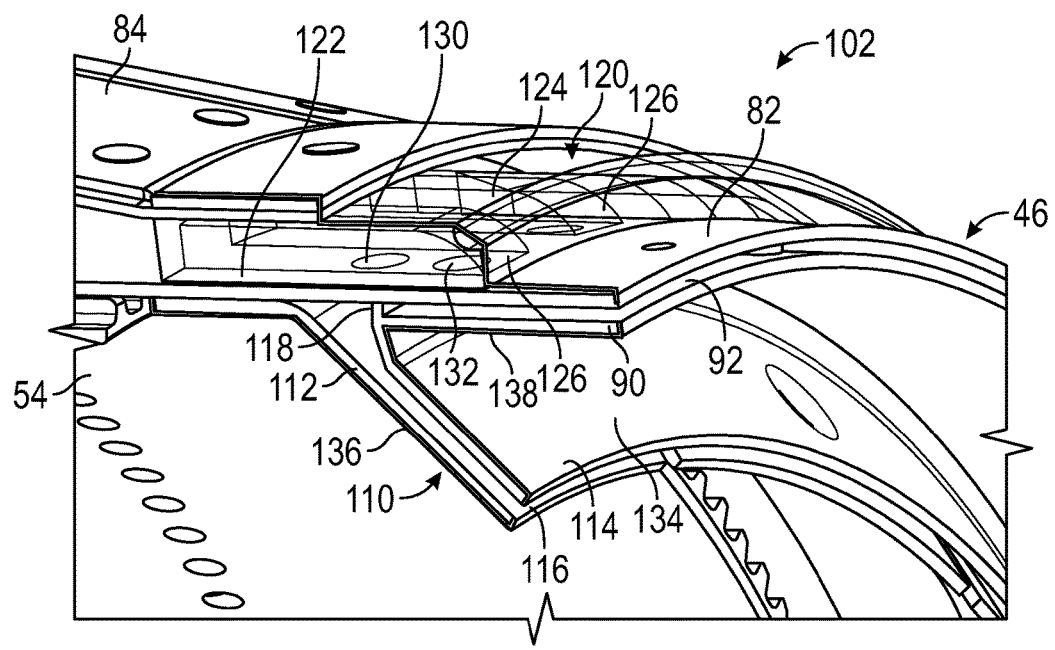
FIG. 4 is a cut-away, isometric view of a portion of an output end of a combustor basket including a double-wall exit cone and splash plate.

FIG. 4 is a broken-away, isometric view of a portion of an output end of a combustor basket 102 according to one proposed design, where like elements to the discussion above are shown by the same reference number. In one design change, the exit cone 80 is replaced with a double-wall exit cone 110 including an inner cone wall 112 and an outer cone wall 114 defining an annular channel 116 therebetween, where both of the walls 112 and 114 are mounted to the basket liner 54 at the basket exit 46, as shown. The outer cone wall 114 includes a barrier wall portion 118 that engages an end of the splash plate 90 and the basket liner 54. Another design change includes providing an extended spacer ring 120 mounted to an outside surface of the basket liner 54 at the basket exit 46, where the spring clip 84 is secured to an outside surface of the spacer ring 120, as shown. The spacer ring 120 includes outer walls 122 that define an enclosure and inner walls 124 that define a series of parallel flow channels 126 within the enclosure. Cooling air flowing between the spring clip 84 and the basket liner 54 flows into and through the flow channels 126. In an alternate embodiment, the spring clip 84 can be secured to the basket liner 54 farther upstream or down stream from the position shown, where the spacer ring 120 can be eliminated.

A series of spaced apart pairs of adjacent feed holes 130 and 132 are formed through the bottom wall of the spacer ring 120 and are aligned with cooperating feed holes (not shown) in the basket liner 54. The feed holes 130 and 132 are positioned on opposite sides of the barrier wall portion 118 of the outer exit cone wall 114, where the holes 130 are in fluid communication with the channel 116 between the exit cone walls 112 and 114, but not the channel 92, and the holes 132 are in fluid communication with the channel 92, but not the channel 116. The holes 130 and 132 are properly metered, i.e., have a certain relative size, so that the desired amount of cooling air is provided to the exit cone 110 and the desired amount of cooling air provided to the splash plate 90, where the barrier wall portion 118 prevents the cooling air from combining. Thus, in this design, an outer surface of the exit cone wall 114 and an inner surface of the exit cone wall 112 that are not exposed to the cooling air have a thermal barrier coating 134 and 136, respectively, that helps prevent those components from being burned by the hot working gas. Also, a thermal barrier coating 82 is provided on an outer surface of the basket liner 54 at the exit 46.

The combustor basket 102 has been shown to be effective in providing cooling air to the relevant parts at the end of the combustor basket 102. However, improvements can be made to this design so as to reduce the cost of the overall basket including reducing the part count, reducing the installation time, reducing the machining required, reducing the number of welds, etc. For example, because the parts are welded together, the thermal expansion of the parts creates high stresses at the joints, which increases the possibility of failure. The present invention proposes another embodiment that combines several of the parts at the output end of the combustor basket 102 as a single integrated piece so as to reduce the part count, manufacturing complexities, installation time, etc. This combination of components reduces the number of welds thus eliminating stresses caused by the welds. This embodiment, as a result of individual cooling holes, also allows for circumferentially varying cooling, i.e., providing larger holes and closer pitch, which allows the cooling to be concentrated in hotter regions.

Figure 5:
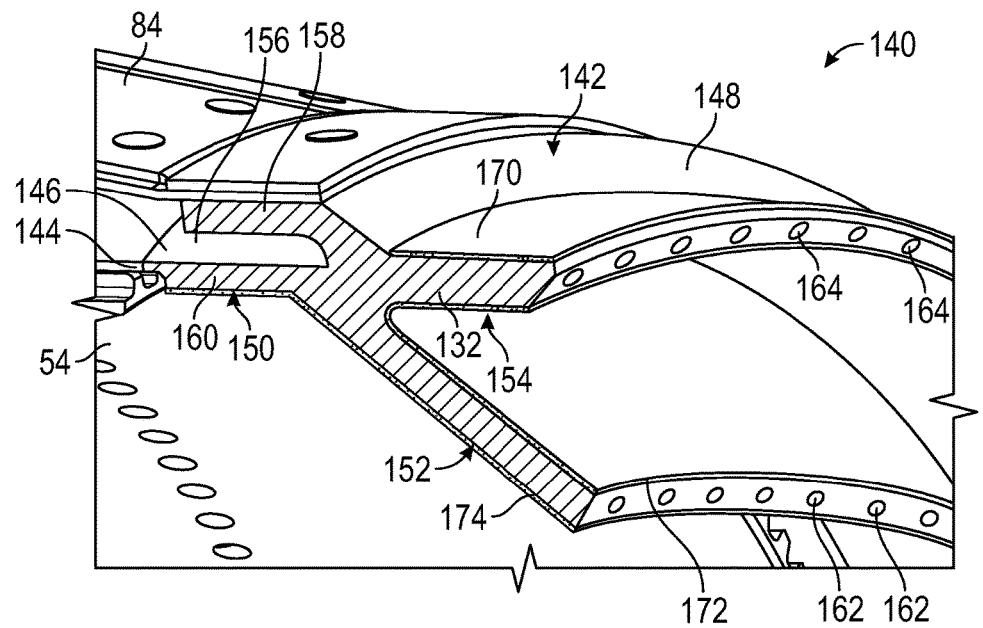
FIG. 5 is a cut-away, isometric view of a portion of an output end of a combustor basket including an integrated exit cone and splash plate member.
Figure 6:
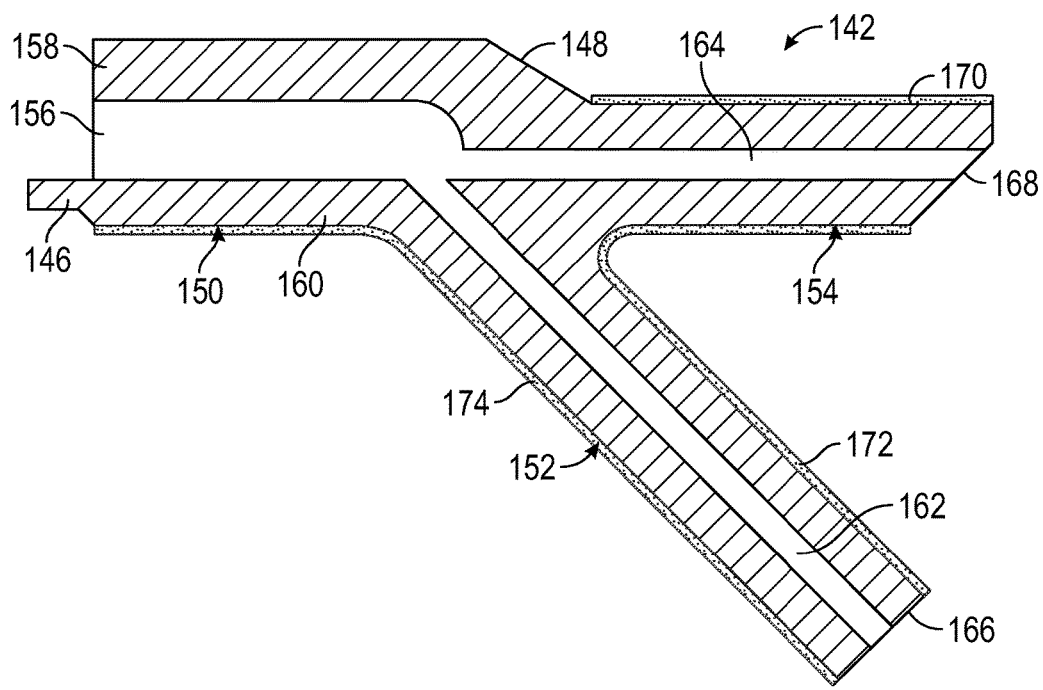
FIG. 6 is a cross-sectional view of the exit cone and splash plate member removed from the combustor basket.

FIG. 5 is a broken-away, isometric view of a portion of an output end of a combustor basket 140 according to this proposed design, where like elements to the combustor basket 102 are shown by the same reference number. In this design, the double-wall exit cone 110, the splash plate 90, the spacer ring 120 and the exit end of the basket liner 54 are reconfigured as an integrated single piece exit cone and splash plate member 142. FIG. 6 is a cross-sectional view of the exit cone and splash plate member 142 separated from the combustor basket 140. In this design, the basket liner 54 is reduced in length and ends at annular liner edge 144, where the exit cone and splash plate member 142 includes a flange 146 that is welded to the liner edge 144. The exit cone and splash plate member 142 can be fabricated using any metal suitable for the purposes discussed herein, such as by forging, casting, etc.

The exit cone and splash plate member 142 includes a base portion 150, an exit cone portion 152 and a splash plate portion 154, where an angled transition portion 148 is provided between the base portion 150 and the splash plate portion 154. The transition portion 148 replaces the spacer ring 120 and bridges the gap between the liner 54 and the spring clip 84. The base portion 150 includes an annular flow channel 156 between an upper wall portion 158 and a lower wall portion 160 that extends circumferentially around the exit cone and splash plate member 142. The exit cone portion 152 includes a series of spaced apart cooling feed holes 162 in fluid communication with the channel 156 and the splash plate portion 154 includes a series of spaced apart cooling feed holes 164 in fluid communication with the channel 156. The cooling air received by the channel 156 flows into the holes 162 and out an output end 166 of the exit cone portion 152. Likewise, cooling air from the chamber 156 flows into the holes 164 and out an output end 168 of the splash plate portion 154. The diameter, number, spacing, pitch, etc. of the feed holes 162 and 164 can be selected for an optimal cooling desired for a particular gas turbine engine in combination with the pressure and flow of the cooling air, where the spacing between the holes 162 and 164 and the size of the holes 162 and 164 can be optimized to provide more cooling for hotter regions.

As with the combustor basket 102 discussed above, a thermal barrier coating is provided on the surfaces of the exit cone and splash plate member 142 that do not receive the cooling air. Particularly, a thermal barrier coating 170 is provided on an outer surface of the splash plate portion 154, a thermal barrier coating 172 is provided on an inner surface of the splash plate portion 154 and an outer surface of the exit cone portion 152, and a thermal barrier coating 174 is provided on an inner surface of the base portion 150 and an inner surface of the exit cone portion 152.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A combustor basket assembly for a combustor in a gas turbine engine, said combustor basket assembly comprising a combustor basket including a basket liner having an input end and an output end through which a hot working gas exits the combustor basket, said combustor basket further including a single piece member affixed to the output end of the basket liner, said single piece member including a base portion, a splash plate portion integral with the base portion and an exit cone portion integral with the base portion, where the hot working gas exits the combustor basket through the exit cone portion,
   wherein the splash plate portion extends from an aft end of the base portion and the exit cone portion extends at an angle from the aft end of the base portion so as to define an annular channel between the splash plate portion and the exit cone portion, wherein the base portion includes a cooling air chamber that receives a cooling air flow, the splash plate portion includes a first plurality of cooling air feed holes that are in fluid communication with the cooling air chamber and receive a first portion of cooling air therefrom, and the exit cone portion includes a second plurality of cooling air feed holes that are in fluid communication with the cooling air chamber and receive a second portion of cooling air therefrom, the cooling air flow from the cooling air chamber is split into the first plurality of cooling air feed holes and the second plurality of cooling air feed holes so that the first portion of cooling air and the second portion of cooling air flow in parallel.

2. The combustor basket assembly according to claim 1, wherein a first spacing between each of the first plurality of cooling air feed holes, a second spacing between each of the second plurality of cooling air feed holes, a first size of each of the first plurality of cooling air feed holes and a second size of each of the second plurality of cooling air feed holes are selected to regulate the amount of cooling air flow split between the first plurality of cooling air feed holes and the second plurality of cooling air feed holes.

3. The combustor basket assembly according to claim 1, wherein the cooling air chamber is an annular chamber that is circumferentially disposed around the single piece member.

4. The combustor basket assembly according to claim 1, wherein the single piece member is an annular member where the splash plate portion has a larger diameter than a diameter of the exit cone portion.

5. The combustor basket assembly according to claim 1, further comprising an annular spring clip mounted to an outer wall of the base portion, the annular spring clip allowing the cooling air flow to the base portion.

6. The combustor basket assembly according to claim 1, wherein an inner surface and an outer surface of the exit cone portion are coated with a thermal barrier coating.

7. The combustor basket assembly according to claim 1, wherein an inner surface and an outer surface of the splash plate portion are coated with a thermal barrier coating.

8. The combustor basket assembly according to claim 1, wherein the single piece member is welded to the output end of the basket liner.

9. An annular single piece member operable to be affixed to an output end of a basket liner associated with a combustor in a gas turbine engine, said annular single piece member comprising a base portion, a splash plate portion integral with the base portion and an exit cone portion integral with the base portion, wherein the base portion includes an annular cooling air chamber that receives a cooling air flow, the splash plate portion includes a first plurality of cooling air feed holes that are in fluid communication with the annular cooling air chamber and receive the cooling air flow therefrom, and the exit cone portion includes a second plurality of cooling air feed holes that are in fluid communication with the annular cooling air chamber and receive the cooling air flow therefrom; and wherein the splash plate portion extends from an aft end of the base portion and the exit cone portion extends at an angle from the aft end of the base portion so as to define an annular channel between the splash plate portion and the exit cone portion.

10. The annular single piece member according to claim 9, wherein the splash plate portion has a larger diameter than a diameter the exit cone portion.

11. The annular single piece member according to claim 9, wherein an inner surface and an outer surface of the exit cone portion are coated with a thermal barrier coating, and an inner surface and an outer surface of the splash plate portion are coated with a thermal barrier coating.

12. A gas turbine engine, comprising:
a shaft provided along a center line of the gas turbine engine;
a compressor section responsive to a working fluid and being operable to compress the working fluid to produce a compressed working fluid;
a combustion section in fluid communication with the compressor section that receives the compressed working fluid, said combustion section including a plurality of combustors that mix the compressed working fluid with a fuel and combust the compressed fluid and fuel mixture to produce a hot working gas, each combustor including a combustor basket assembly in which the combustion occurs, said combustor basket assembly comprising a combustor basket including a basket liner having an input end and an output end through which the hot working gas exits the combustor basket, said combustor basket further including a single piece member affixed to the output end of the basket liner, said single piece member including a base portion, a splash plate portion integral with the base portion and an exit cone portion integral with the base portion, where the hot working gas exits the combustor basket through the exit cone portion, wherein the splash plate portion extends from an aft end of the base portion and the exit cone portion extends at an angle from the aft end of the base portion so as to define an annular channel between the splash plate portion and the exit cone portion; and
a turbine section in fluid communication with the combustion section, said turbine section expanding the hot working gas to produce mechanical power through rotation of the shaft, wherein the base portion includes a cooling air chamber that receives a cooling air flow, the splash plate portion includes a first plurality of cooling air feed holes that are in fluid communication with the cooling air chamber and receive a first portion of cooling air therefrom, and the exit cone portion includes a second plurality of cooling air feed holes that are in fluid communication with the cooling air chamber and receive a second portion of cooling air therefrom, the cooling air flow from the cooling air chamber is split into the first plurality of cooling air feed holes and the second plurality of cooling air feed holes so that the first portion of cooling air and the second portion of cooling air flow in parallel.

13. The gas turbine engine according to claim 12, wherein the cooling air chamber is an annular chamber that is circumferentially disposed around the single piece member.

14. The gas turbine engine according to claim 12, wherein the single piece member is an annular member where the splash plate portion has a larger diameter than a diameter of the exit cone portion.

15. The gas turbine engine according to claim 12, further comprising an annular spring clip mounted to an outer wall of the base portion, the annular spring clip allowing the cooling air flow to flow to the base portion.

16. The gas turbine engine according to claim 12, wherein an inner surface and an outer surface of the exit cone portion are coated with a thermal barrier coating.

17. The gas turbine engine according to claim 12, wherein an inner surface and an outer surface of the splash plate portion are coated with a thermal barrier coating.

* * * * *